Aug. 30, 1955    S. D. POOL ET AL    2,716,358
UNEQUAL TORQUE DIFFERENTIAL
Filed Oct. 19, 1953    2 Sheets-Sheet 1

INVENTOR
STUART D. POOL
WILLIAM H. WALKER
Paul O. Pippel
ATTORNEY

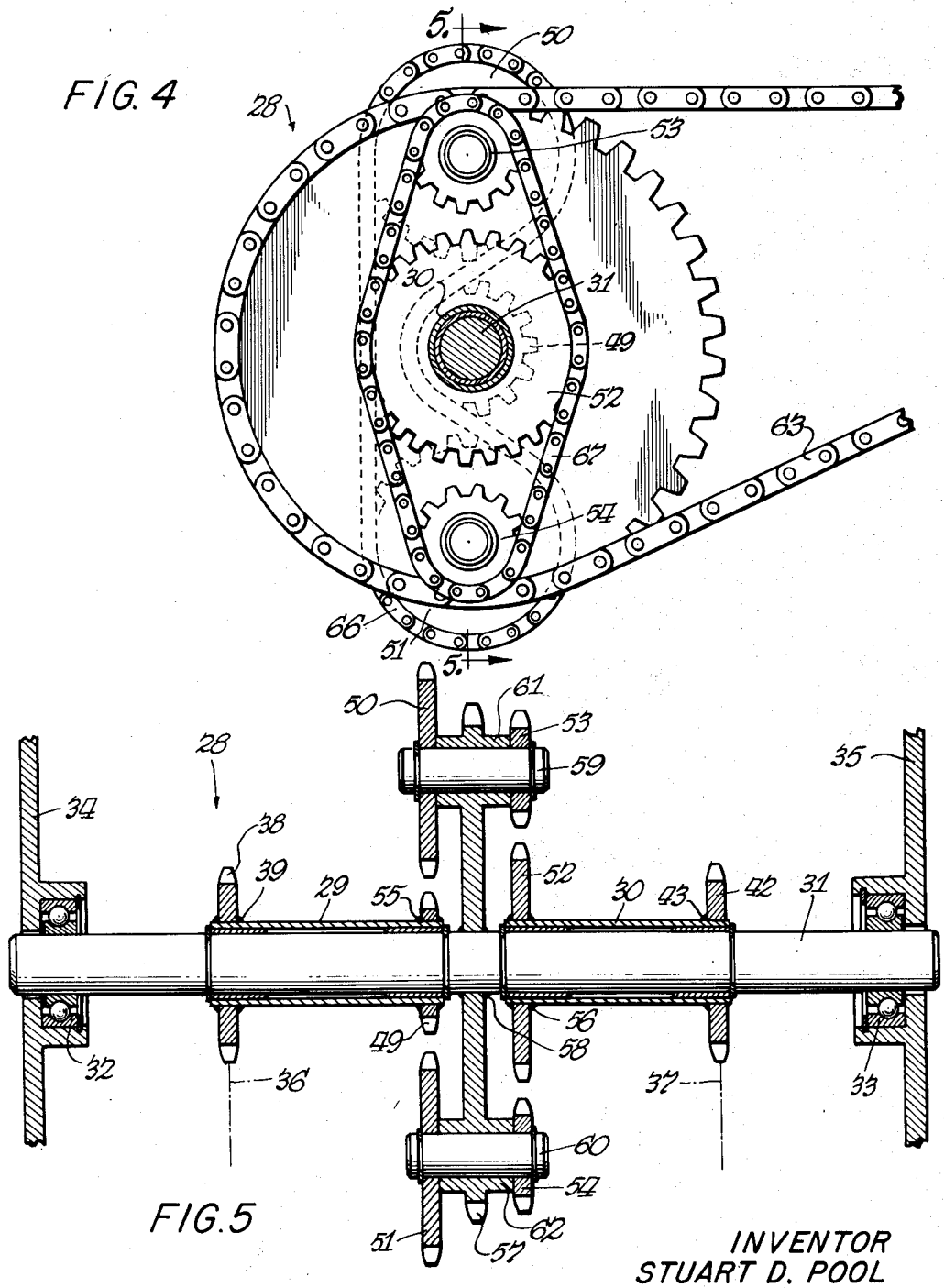

United States Patent Office 2,716,358
Patented Aug. 30, 1955

2,716,358

UNEQUAL TORQUE DIFFERENTIAL

Stuart D. Pool, Moline, and William H. Walker, East Moline, Ill., assignors to International Harvester Company, a corporation of New Jersey Application October 19, 1953, Serial No. 386,860

4 Claims. (Cl. 74—710)

This invention relates to a new and improved unequal torque differential.

Differentials are employed on vehicles for the purpose of dividing torque input equally between spaced-apart driving axles usually located on opposite sides of the vehicle and carrying the ground driving wheels. Ordinarily a vehicle differential consists of a plurality of gears including axle driving pinion gears and a driven ring gear. The two vehicle axles through equal diameter gears apply equal force at opposite points on the peripheries of the pinion gears. This balances the torques on the pinion gears at all times whether they are rotating or stationary. The power input from the ring gear is transmitted from the axles by the translational motion of the pinions. The relative speed between the two axles is not involved in the balance of force since the pinions are free to rotate either way. The difference in speed is a function of the distance each wheel travels or of the balance in torque when there is wheel slippage. The summation of the axle speeds must equal ring gear speed. In straight run non-slip operation the axles rotate at ring gear speed. Holding the ring gear stationary and rotating one wheel forces the other wheel to rotate in the opposite direction at the same speed. This action takes place when one wheel turns faster than the other, the faster is over ring-gear speed by the amount the slower is under ring-gear speed.

The above described differential is what is generally known as a standard differential and as such is applicable to most vehicles and particularly those vehicles that are substantially symmetrical insofar as weight and physical size distribution are concerned about a generally longitudinal disposed center line. The present invention is concerned with an unequal torque differential which may be made applicable for any type of vehicle which has an odd weight or external size distribution. Such machines are often found in farm equipment and particularly in relatively large machines, such as harvester-threshers, cotton pickers and the like wherein there is lacking a symmetry of construction not by reason of improper industrial styling but rather by reason of the necessary aggregation of incongruous shaped elements necessary to the actual functioning of the farm machines. In both of the machines mentioned, namely, the harvester-thresher and the cotton picker, there is the additional problem of the constant addition of weight during use of the machine as the above harvesting machines must be capable of picking, treating, and storing material to be harvested. It has been the practice of farm equipment engineers to utilize spaced-apart identical wheels along with a standard differential on these large unwieldy agricultural implements. This has been true even though one of these wheels might be going to bear an excessive load by reason of the weight distribution on the machine, and the other wheel bear a minimum of machine weight.

It is, therefore, an object of the present invention to provide a vehicle with a larger wheel to carry the greater weight and a relatively smaller wheel to carry the light part of the vehicle.

An important object of this invention is the provision of an unequal torque differential in combination with unequal wheels employed on non-symmetrical vehicles. Another important object of this invention is to supply a chain type unequal torque differential for ground traversing vehicles.

Another and further important object of this invention is to provide a differential for unequal size ground-engaging wheels, each bearing an unequal proportion of the vehicle load and wherein the torques on the unequal wheels are balanced.

Other and further important objects and advantages will become apparent from the following specification and accompanying drawings:

In the drawings:

Fig. 4 is an enlarged sectional view taken on the line 4—4 through the unequal torque differential as shown in Fig. 3.

Fig. 5 is a sectional view taken on the line 5—5 of Fig. 4.

Figure 1:
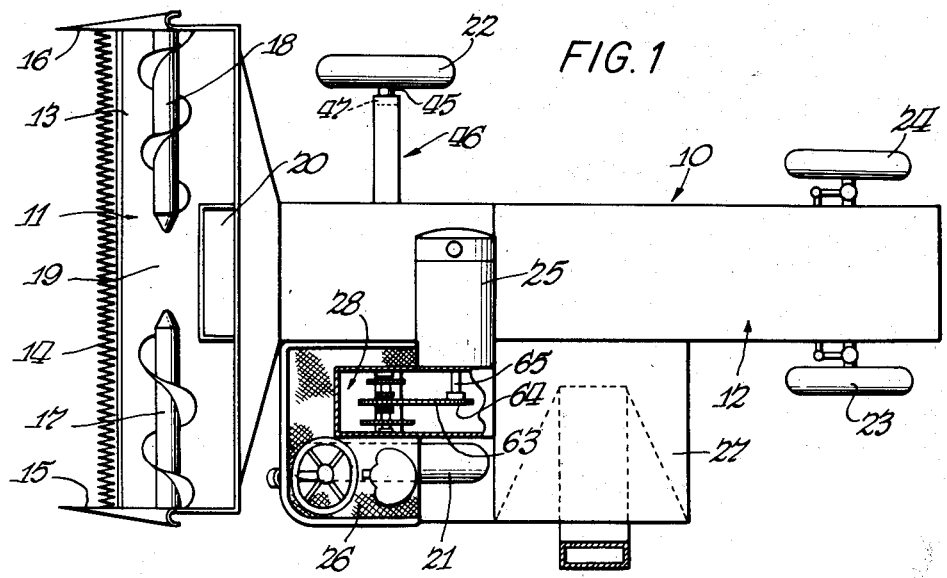
Fig. 1 is a top plan view of the unequal torque differential of this invention applied to a self-propelled harvester-thresher.

For purposes of illustration only the invention has been shown applied to a harvester-thresher. It should be understood that it could be applied to any vehicle or implement desired.

As shown in the drawings, the reference numeral 10 indicates generally a self-propelled harvester-thresher having a forwardly disposed harvesting portion 11 and a rearwardly extending threshing portion 12. The harvesting portion consists of a relatively wide platform 13 having a crop cutting sickle bar 14 along the forward edge thereof. The platform 13 is provided with spaced end walls 15 and 16 which constitute grain dividing members. Further, the harvester has mounted thereon oppositely extending auger conveyor members 17 and 18 which are journally mounted in the end walls 15 and 16 respectively and cooperate to deliver grain deposited on the platform to a position centrally between the inner ends of the opposed auger conveyors, as shown at 19. Feeder conveyor means 20 is provided rearwardly of this central receiving portion 19 adapted to carry the harvested centrally aggregated grains rearwardly for treatment by the threshing portion 12 of this self-propelling harvester-thresher.

The harvester-thresher 10 is carried on spaced-apart traction wheels 21 and 22 at a relatively forward position on the vehicle and on rearwardly disposed, relatively narrowly spaced steerable wheels 23 and 34. An engine 25 is adapted to impart rotational drive to the harvesting and threshing elements of the implement and simultaneously to the driving ground wheels 21 and 22. An operator's station 26 is located to one side of the longitudinally disposed thresher part 12 just forwardly of a relatively large grain storage tank 27 which is also mounted to one side of the thresher part 12.

The traction wheels 21 and 22 are not the same size inasmuch as the wheel 21 is adapted to carry the major portion of the weight of the self-propelled harvester-thresher and thus requires a larger and more substantial wheel in order to safely accommodate this excessive load. Similarly, the traction wheel 22 is considerably smaller than the wheel 21 inasmuch as it carries only a small portion of the vehicle weight.

An unequal torque differential is shown at 28 adjacent the engine 25 and aids in the distribution of engine rotational drive to the unequal size traction wheels 21 and 22 in such a manner that the torque on the two wheels is substantially identical commensurate with the load carried by the wheels and further the speed of rotation of these unequal size wheels are compensated for to enable them to operate at different speeds in order to propel the vehicle at a uniform ground speed.

The differential 28 is shown, in detail, in enlarged Figures 4 and 5. In this particular unequal torque chain differential, the elements corresponding to the wheel axles or shafts in a standard differential comprise sleeves 29 and 30 which are both journally mounted over and on a stationary shaft 31 which is carried in spaced bearing members 32 and 33 within the spaced walls 34 and 35 of the gear housing for the differential 28. It is, therefor, the function of the sleeve members 29 and 30 to be driven with unequal torques in order that the unequal size wheels may have their driving torque properly balanced. The relative speeds of the sleeves 29 and 30 may be the same although this is not necessarily essential. Obviously, there must be a greater torque provided for the larger wheel in order that the driving torques may be equal and it is the purpose of the unequal torque differential of this invention to equip the elements to be driven with respective torques which will overcome the unequal weight distribution on the vehicle and provide for efficient operation of the vehicle. Although the wheels 21 and 22 to be driven are not directly mounted on the sleeve elements 29 and 30, they do, in fact, correspond to the axles for those wheels as they would exist in a standard differential. In the present instance, however, rotational drive from the sleeve elements 29 and 30 of the unequal torque differential are transmitted downwardly to the actual wheel axles through means of chains 36 and 37. The chain 36 is joined with the sleeve element 29 through the medium of a sprocket 38 weldably fastened as at 39 to the sleeve 29. The lower end of the chain 36 is mounted on a relatively large sprocket 40 which is carried on an axle 41. Similarly the chain 37 is mounted at its upper end on a sprocket pinion 42 which is welded, as shown at 43, to the sleeve 30. The lower end of the chain 37 is mounted on and drives a sprocket 44 which, in turn, is keyed or otherwise fastened to an axle 45 carrying the smaller traction wheel 22. The axles 41 and 45 are carried in a wheel truck frame structure generally indicated at 46. The threshing mechanism 12 is carried directly on this wheel truck frame structure 46. The frame structure further includes a depending portion 47 in order to take care of the lower disposed wheel axle 45. A spaced-apart depending portion 48 is in alignment with the depending portion 47 and thus provides spaced bearing means for the elongated axle 45 which has the driving sprocket 44 just outside the depending portion 48 at one end and the smaller traction wheel 22 just outside the depending portion 47 at the other end.

The sleeve structure 29, in addition to the one fixed sprocket pinion, has a second spaced-apart sprocket 49 which is in planar alignment with pinion sprockets 50 and 51 of the unequal torque differential. Similarly, the spaced-apart sleeve element 30 has a sprocket 52 spaced from the fixed sprocket 42 which lies in planar alignment with radially outwardly disposed pinion sprockets 53 and 54. The sprockets 49 and 52 are weldably attached respectively to their sleeves 29 and 30 at 55 and 56.

Figure 2:
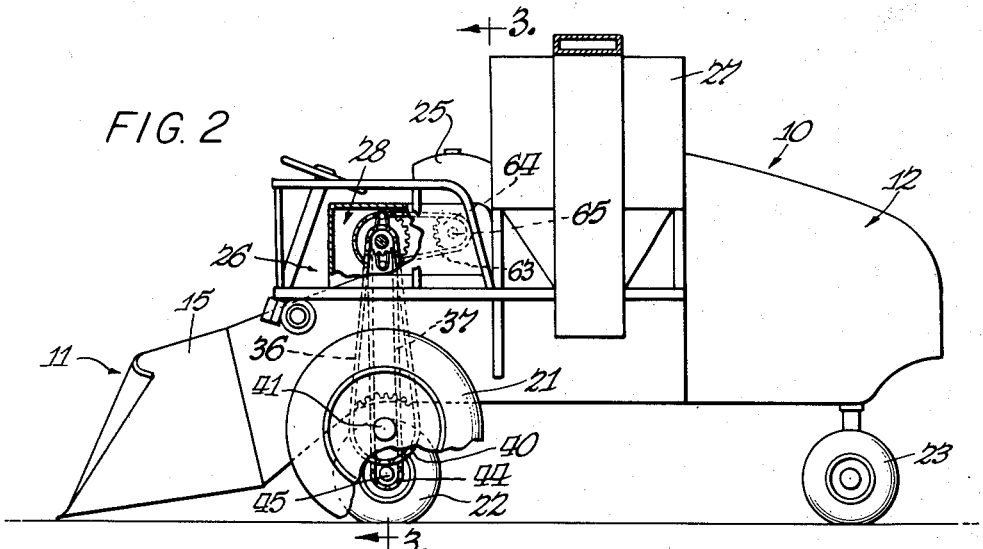
Fig. 2 is a side elevational view, with portions thereof broken away, of the device as shown in Fig. 1.
Figure 3:
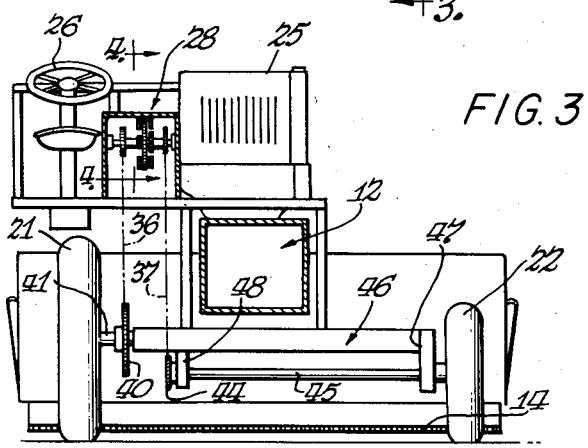
Fig. 3 is a sectional view taken on the line 3—3 of Fig. 2.

An enlarged ring sprocket 57 is centrally disposed between the sleeve members 29 and 30, and is welded, as shown at 58, to the inner shaft 31 on which the sleeves 29 and 30 are journalled. The ring sprocket is provided with radially outwardly spaced pinion shafts 59 and 60. These shafts 59 and 60 are journalled within enlarged boss elements 61 and 62 within the ring sprocket 57. The pinion shafts 59 and 60 journally carry the pinion sprockets 50 and 53, and 51 and 54, respectively. The enlarged ring sprocket 57 is driven by means of the roller chain 63 directly from the engine 25 through a sprocket 64 which is mounted on the engine-driven shaft 65, as best shown in Figs. 1 and 2. It will thus be seen that the unequal torque differential of this invention receives its drive input through the enlarged ring sprocket 57. A chain 66 is trained around the aligned sprockets 49, 50, and 51. A laterally spaced-apart chain 67 joins the aligned sprockets 52, 53, and 54. Thus, as the chain 63 is driven by the engine 25, rotational drive is delivered to the sleeve elements 29 and 30 and, by reason of the differential in sprocket sizes comprising this differential, the torque delivered to the sleve elements 29 and 30 is unequally divided and thus a greater torque is delivered to the larger traction wheel 21 than is delivered to the spaced-apart smaller traction wheel 22. This, of course, compensates for the increased load carried by the larger wheel. It is entirely possible that the sprockets 38 and 42 will be driven at the same speed of rotation although the torque output of each is substantially different. As shown in the drawings, this required differential in speed of the wheels in order to compensate for the two sizes of traction wheels, is accomplished by varying the sizes of the sprockets 40 and 44, respectively. The smaller traction wheel 22 must have a greater speed of rotation in order to have a comparable ground travel with the larger traction wheel 21 and thus the sprocket 44, associated with the small traction wheel 22, is considerably smaller than the large sprocket 40 which effects drive of the large traction wheel 21. The axle torque ratio should equal the weight ratio on the driving wheels. The relation of gear diameters to axle pinion gear diameters 49 and 52 when the torque ratio equals the weight ratio is as follows:

$$\frac{\text{The diameter of the pinion sprockets 50 and 51}}{\text{The diameter of the pinion sprockets 53 and 54}} = \frac{\text{The vehicle weight on the small traction wheel 22} \times \text{the diameter of the large traction wheel 21 gear 49}}{\text{The vehicle weight on the large traction wheel 21} \times \text{the diameter of small traction wheel 22 gear 52}}$$

The torque ratio on the axles is not affected by the increased speed of the smaller wheel by reason of the differential in size of the sprockets 40 and 44 since the mechanical advantage between the ground and differential for each wheel is unchanged. When an implement is turning, the action of a standard differential is different from that of an unequal torque differential. Turning implements on a radius requires the outer wheel to increase its speed by the amount the inner wheel decreases its speed if the wheels do not slip. The standard differential automatically accomplishes this result; however, in the unequal torque differential of this invention there is a speed ratio between the axles equal to the torque ratio when the sprockets 50 and 51, and 53 and 54 are rotating. This axle speed ratio will speed up or slow down the ring sprocket 57 when an implement with an unequal torque differential turns.

It is apparent that the device of this invention contributes to efficient vehicle operation regardless of the weight and physical dimension distribution of that vehicle. Certainly, the unequal torque differential is very conducive to the farm implement field where there are so many odd shaped field traversing implements. By employing the unequal torque differential, farm equipment engineers are able to prescribe the proper traction wheel sizes independent of cooperating traction wheels, thus making for long and efficient implement life.

Various details of construction may be varied throughout a wide range without departing from the principles disclosed herein and we, therefore, do not propose limiting the patent granted hereon otherwise than as necessitated by the appended claims.

What is claimed is:

1. An unequal torque differential for vehicles of the type having a relatively large traction wheel adapted to carry the major portion of the vehicle load and a spaced-apart smaller traction wheel adapted to carry a minor portion of the vehicle load, comprising a supporting housing, a driven shaft journalled in said supporting housing, a ring sprocket fixedly attached to said driven shaft, pinion shafts journalled in said ring sprocket spaced radially outwardly from said driven shaft, pinion sprockets of unequal sizes mounted on said pinion shafts, spaced-apart sleeve elements journalled on said driven shaft, a sprocket fixed to each of said sleeve elements and being of unequal sizes, the smaller of said sprockets in planar alignment with the larger pinion sprockets, the larger of said sprockets in planar alignment with the smaller pinion sprockets, and chains joining each set of aligned sprockets whereby unequal torques are delivered to said sleeve elements.

2. A device as set forth in claim 1 in which there is means imparting the greater torque from the one sleeve element to the large traction wheel and means imparting the lesser torque from the other sleeve element to the smaller traction wheel.

3. A device as set forth in claim 1 in which each of said sleeve elements includes a spaced apart sprocket forming a unitary part thereof, a sprocket associated with said large traction wheel, a sprocket associated with said smaller traction wheel, and chains joining the spaced-apart sprocket on the sleeve element having the greater torque with the sprocket associated with the large traction wheel, and the spaced-apart sprocket on the sleeve element having the lesser torque with the sprocket associated with the smaller traction wheel.

4. A device as set forth in claim 3 in which the sprocket associated with the smaller traction wheel is smaller than the sprocket associated with the larger traction wheel whereby the smaller traction wheel is driven at a greater rate of speed in order that the larger and smaller traction wheels may have the same ground speed.

References Cited in the file of this patent

UNITED STATES PATENTS

| | | |
|---|---|---|
| 1,072,834 | Devlin | Sept. 9, 1913 |
| 1,227,382 | Cardin | May 22, 1917 |
| 1,235,249 | Salfisberg | July 31, 1917 |
| 1,372,321 | Skarnes | Mar. 22, 1921 |
| 1,399,045 | Bernstein | Dec. 6, 1921 |
| 2,218,510 | Albertson | Oct. 22, 1940 |
| 2,408,264 | McClure | Sept. 24, 1946 |

FOREIGN PATENTS

| | | |
|---|---|---|
| 266,753 | Germany | Nov. 1, 1913 |
| 878,141 | Germany | June 1, 1953 |